US012394536B2

(12) United States Patent
Virkar et al.

(10) Patent No.: US 12,394,536 B2
(45) Date of Patent: Aug. 19, 2025

(54) SILVER NANOWIRE AND NOBLE-METAL COATED SILVER NANOWIRE CONDUCTIVE POLYMER COMPOSITES WITH LOW LOADING PERCOLATION CONDUCTION

(71) Applicant: EKC Technology, Inc., Hayward, CA (US)

(72) Inventors: Ajay Virkar, San Mateo, CA (US); Xiqiang Yang, Hayward, CA (US); Nazim Uddin, Hayward, CA (US); Peikang Liu, Claremont, CA (US)

(73) Assignee: EKC Technology, Inc., Hayward, CA (US)

( * ) Notice: Subject to any disclaimer, the term of this patent is extended or adjusted under 35 U.S.C. 154(b) by 0 days.

(21) Appl. No.: 18/376,952

(22) Filed: Oct. 5, 2023

(65) Prior Publication Data

US 2024/0290516 A1 Aug. 29, 2024

Related U.S. Application Data

(60) Provisional application No. 63/414,143, filed on Oct. 7, 2022.

(51) Int. Cl.
*H01B 1/22* (2006.01)
*H05B 3/00* (2006.01)
(Continued)

(52) U.S. Cl.
CPC ............ *H01B 1/22* (2013.01); *H05B 3/0014* (2013.01); *H05B 3/12* (2013.01); *H05B 3/54* (2013.01); *H05B 2214/04* (2013.01)

(58) Field of Classification Search
CPC .. H01B 1/00; H01B 1/22; C23C 18/42; H05B 3/0014; H05B 3/12
See application file for complete search history.

(56) References Cited

U.S. PATENT DOCUMENTS

| | | | |
|---|---|---|---|
| 4,999,136 | A | 3/1991 | Su et al. |
| 6,918,984 | B2 | 7/2005 | Murray et al. |

(Continued)

FOREIGN PATENT DOCUMENTS

| | | | |
|---|---|---|---|
| CN | 104263303 | A | 5/2016 |
| CN | 105679394 | A | 6/2016 |

(Continued)

OTHER PUBLICATIONS

Lu et al "Preparation of gold-decorated silver nanowires for improving conductivity of electrically conductive adhesives", Journal of Materials Science: Materials in Electronics (2020) 31:14601-14607.*

(Continued)

*Primary Examiner* — Mark Kopec
(74) *Attorney, Agent, or Firm* — Christensen, Fonder, Dardi PLLC; Peter S. Dardi; Elizabeth A. Gallo

(57) ABSTRACT

Composite materials with noble metal coated silver nanowires loaded into polymer are described. The composite materials may have resistivities of no more than about 100 Ohm-cm, or from about 100 Ohm-cm to about $1\times10^{11}$ Ohm-cm depending on the amount of noble metal coated silver nanowires loaded into the polymer. The noble metal coated silver nanowires may be platinum coated silver nanowires. Metal particulates such as silver flakes or silver particles may be added to the composite materials in order to obtain desired properties. Composite precursor compositions and methods for preparing the composite materials are described.

22 Claims, 1 Drawing Sheet

(51) Int. Cl.
*H05B 3/12* (2006.01)
*H05B 3/54* (2006.01)

(56) References Cited

U.S. PATENT DOCUMENTS

| | | | |
|---|---|---|---|
| 7,569,160 B2 | 8/2009 | Oldenzijl et al. | |
| 7,928,322 B2 | 4/2011 | Oki et al. | |
| 8,252,385 B2 | 8/2012 | Ittel et al. | |
| 8,349,467 B2 | 1/2013 | Naoi | |
| 8,466,366 B2 * | 6/2013 | Srinivas | H10K 50/81 174/126.1 |
| 8,709,289 B2 | 4/2014 | Rouse et al. | |
| 9,183,968 B1 | 11/2015 | Li et al. | |
| 9,530,534 B2 | 12/2016 | Hu et al. | |
| 9,589,693 B2 | 3/2017 | Dreezen et al. | |
| 9,609,793 B2 | 3/2017 | Kawaguchi | |
| 9,668,343 B2 | 5/2017 | Furusho et al. | |
| 9,680,160 B2 | 6/2017 | Yan et al. | |
| 9,714,370 B2 * | 7/2017 | Mrozek | H01B 1/22 |
| 9,920,207 B2 | 3/2018 | Virkar et al. | |
| 9,982,155 B2 | 5/2018 | Furutachi | |
| 10,029,916 B2 | 7/2018 | Virkar et al. | |
| 10,037,831 B2 | 7/2018 | Garting et al. | |
| 10,285,280 B2 | 5/2019 | Iseda et al. | |
| 10,308,777 B2 | 6/2019 | Wong et al. | |
| 10,403,849 B2 | 9/2019 | Zhai | |
| 10,487,222 B2 | 11/2019 | de Zeeuw et al. | |
| 10,714,230 B2 | 7/2020 | Hu et al. | |
| 11,111,396 B2 | 9/2021 | Yang et al. | |
| 11,111,421 B2 | 9/2021 | Natori | |
| 2011/0291032 A1 * | 12/2011 | Sun | H01F 1/0081 252/514 |
| 2012/0255762 A1 | 10/2012 | Katagiri et al. | |
| 2014/0234661 A1 | 8/2014 | Allemand et al. | |
| 2014/0251662 A1 | 9/2014 | Rotto et al. | |
| 2015/0250078 A1 | 9/2015 | Matsuda et al. | |
| 2016/0118156 A1 | 4/2016 | Kawaguchi et al. | |
| 2016/0177146 A1 | 6/2016 | Mun et al. | |
| 2016/0293288 A1 | 10/2016 | Hu et al. | |
| 2017/0015857 A1 | 1/2017 | Kodama et al. | |
| 2017/0292026 A1 | 10/2017 | Zhang et al. | |
| 2017/0294248 A1 | 10/2017 | Wiley | |
| 2019/0018297 A1 | 1/2019 | Goebel et al. | |
| 2021/0126141 A1 | 4/2021 | Shih | |
| 2022/0275247 A1 | 9/2022 | Kobatake et al. | |
| 2024/0260144 A1 * | 8/2024 | Chen | H05B 3/84 |

FOREIGN PATENT DOCUMENTS

| | | |
|---|---|---|
| CN | 107316707 A | 11/2017 |
| CN | 113402988 A | 9/2021 |
| GB | 2111072 A | 6/1983 |
| JP | 2008-013798 A | 1/2008 |
| JP | 2009-120867 A | 6/2009 |
| JP | 2009-127092 A | 6/2009 |
| JP | 2011-029037 A | 2/2011 |
| JP | 2011-029038 A | 2/2011 |
| JP | 2011-118191 A | 6/2011 |
| JP | 2012-003900 A | 1/2012 |
| JP | 2013-155440 A | 8/2013 |
| JP | 2017-078207 A | 4/2017 |
| JP | 2019-214782 A | 12/2019 |
| WO | 2011-114846 A1 | 9/2011 |
| WO | 2012-141851 A1 | 10/2012 |
| WO | 2015-174348 A1 | 11/2015 |
| WO | 2022-219108 A1 | 10/2022 |

OTHER PUBLICATIONS

Boland et al., "Surface coatings of silver nanowires lead to effective, high conductivity, high-strain, ultrathin sensors", Nanoscale, vol. 9 No. 46, p. 18507-18515, (2017). (Abstract Only).

Choi et al., "Highly conductive, stretchable and biocompatible Ag—Au core-sheath nanowire composite for wearable and implantable bioelectronics", Nature Nanotechnology, vol. 13 No. 11, p. 1048-1056, (Nov. 2018).

Cortes et al., "High-performance thermoplastic composites poly(ether ketone ketone)/silver nanowires: Morphological, mechanical and electrical properties", Journal of Non-Crystalline Solids, vol. 391, p. 106-111, (May 1, 2014).

Lonjon te al., "Low filled conductive P (VDF-TrFE) composites: Influence of silver particles aspect ratio on percolation threshold from spheres to nanowires", Journal of Non-Crystalline Solids, vol. 358 No. 23, p. 3074-3078, (2012).

Moreno et al. "Silver nanowires/polycarbonate composites for conductive films", IOP Conference Series: Materials Science and Engineering, vol. 40 No. 1, (2012).

Moreno et al., "Facile preparation of transparent and conductive polymer films based on silver nanowire/polycarbonate nanocomposites", Nanotechnology, vol. 24 No. 27: 275603 (2013).

Ngyuen et al., "High conductive Ag nanowire—polyimide composites: Charge transport mechanism in thermoplastic thermostable materials", Journal of Non-Crystalline Solids, vol. 385, p. 35-39, (2014).

Park et al., "Conductive cellulose composites with low percolation threshold for 3D printed electronics", Scientific Reports, vol. 7:3246, p. 1-10, (2017).

Wang et al., "A comprehensive study of silver nanowires filled electrically conductive adhesives", Journal of Materials Science: Materials in Electronics, vol. 26, p. 7927-7935, (2015).

Wu et al., "Development of a novel isotropic conductive adhesive filled with silver nanowires", Journal of Composite Materials, vol. 40 No. 21, p. 1961-1969, (2006).

Xu et al., "Electrically conductive silver nanowires-filled methylcellulose composite transparent films with high mechanical properties", Material Letters, vol. 152, p. 173-176, (Aug. 2015).

Yu et al., "Electrical, morphological, and electromagnetic interference shielding properties of silver nanowires and nanoparticles conductive composites", Materials Chemistry and Physics, vol. 136 No. 2-3, p. 334-340, (Oct. 15, 2012).

Zhang et al., "Electrically conductive adhesives with sintered silver nanowires", 2009 International Conference on Electronic Packaging Technology & High Density Packaging, p. 834-837, (2009).

International Search Report for corresponding Patent Application No. PCT/US2023/034571 dated Mar. 12, 2024.

Walsh "Electrode Reactions in Metal Finishing" Transactions of the IMF, 69(3), p. 107-110 (1991).

* cited by examiner

SILVER NANOWIRE AND NOBLE-METAL COATED SILVER NANOWIRE CONDUCTIVE POLYMER COMPOSITES WITH LOW LOADING PERCOLATION CONDUCTION

CROSS REFERENCE TO RELATED APPLICATIONS

This application claims priority to U.S. provisional patent application 63/414,143 filed Oct. 7, 2022 to Virkar et al., entitled "Silver Nanowire And Noble-Metal Coated Silver Nanowire Conductive Polymer Composites With Low Loading Percolation Conduction", incorporated herein by reference.

FIELD OF THE INVENTION

The invention relates to composite materials with noble metal coated silver nanowires loaded into a polymer, in which relatively low resistivity values can be achieved The invention further relates to composite precursor compositions with relatively modest loadings of noble metal coated silver nanowires in a composition that can be cured to form the composite as well as to methods for forming the composite precursor compositions.

BACKGROUND OF THE INVENTION

A significant attention has been devoted to the development of silver nanowires for formation of transparent conductive films. The one-dimensional nature of the metal nanowires provides for formation of conductive networks with sparse metal loadings. For the formation of conductive composites, higher particle loadings can be used since generally especially if transparencies are not an issue. The establishment of a conductive network provides different challenges in thicker structures with a three-dimensional configuration. Generally, silver particles or carbon conductors are used to form conductive composites to provide mechanical strength and electrical conductivity, for example, as an antistatic material or other similar uses.

SUMMARY OF THE INVENTION

In a first aspect, the invention pertains to a composite material comprising noble metal coated silver nanowires and a polymer matrix combined to form the composite material. The composite material may have a resistivity of no more than about 100 Ohm-cm, or no more than about 1 Ohm-cm. The composite material may comprise from about 0.01 wt % to about 40 wt %, or from about 0.1 wt % to about 20 wt %, noble metal coated silver nanowires. In some embodiments, the noble metal coated silver nanowires may comprise platinum coated silver nanowires. In some embodiments, the composite material may comprise at least about 90 wt % of the polymer matrix. Other metal particulates may be added to the composite material, for example, in an amount no more than about the weight of the noble metal coated silver nanowires. The composite material may be configured as a heater in which the composite material is in contact with two bus bars of opposite polarity such that current flows between the bus bars when a voltage is applied.

In another aspect, the invention pertains to a composite material comprising noble metal coated silver nanowires and a polymer matrix combined to form a composite material having a resistivity from about 100 Ohm-cm to about $1\times10^{11}$ Ohm-cm. The composite material may comprise from no more than about 10.0 wt %, in some embodiments no more than about 2.0 wt %, or no more than about 0.1 wt %, noble metal coated silver nanowires. In some embodiments, the noble metal coated silver nanowires may comprise platinum coated silver nanowires. In some embodiments, the composite material may comprise at least about 90 wt % of the polymer matrix. Other metal particulates may be added to the composite material, in an amount no more than about the weight of the noble metal coated silver nanowires.

In another aspect, the invention pertains to a composite precursor composition that can be used to form a composite material. In some embodiments, the composite precursor composition can be cured to form a composite material having a resistivity of no more than about 100 Ohm-cm, or no more than about 1 Ohm-cm. The composite precursor composition comprises noble metal coated silver nanowires which may be from about 0.01 wt % to about 40 wt %, or from about 0.1 wt % to about 20 wt %, of the solid content of the composite precursor composition. In some embodiments, the noble metal coated silver nanowires may comprise platinum coated silver nanowires. The composite precursor composition also comprises polymer precursor composition which may be monomers, oligomers, a solid polymer dissolved in solvent, or a combination thereof. The solids content of the composite precursor composition may comprise at least about 90 wt % of the polymer precursor composition. Other metal particulates may be added to the composite precursor composition, in an amount no more than about the weight of the noble metal coated silver nanowires. The composite precursor composition can be cured to form a solid material by heating, exposing to radiation, chemical treatment, exposure to water or oxygen, or a combination thereof.

In another aspect, the invention pertains to a composite precursor composition that can be used to form a composite material having a resistivity from about 100 Ohm-cm to about $1\times10^{11}$ Ohm-cm. The composite precursor composition comprises noble metal coated silver nanowires which may be no more than about 2.0 wt %, or no more than about 0.1 wt %, of the solid content of the composite precursor composition. In some embodiments, the noble metal coated silver nanowires may comprise platinum coated silver nanowires. The composite precursor composition also comprises polymer precursor composition which may be monomers, oligomers, a solid polymer dissolved in solvent, or a combination thereof. The solids content of the composite precursor composition may comprise at least about 90 wt % of the polymer precursor composition. Other metal particulates may be added to the composite precursor composition, in an amount no more than about the weight of the noble metal coated silver nanowires. The composite precursor composition can be cured to form a solid material by heating, exposing to radiation, chemical treatment, exposure to water or oxygen, or a combination thereof.

In another aspect, the invention pertains to a method of forming a composite precursor composition comprising blending a dispersion of noble metal coated nanowires and a polymer precursor composition to form a well mixed blend. The method can be used to form the composite precursor compositions described above. In some embodiments, the composite precursor composition can be cured to form a composite material having a resistivity of no more than about 100 Ohm-cm, or no more than about 1 Ohm-cm. In some embodiments, the composite precursor composition can be cured to form a composite material having a resistivity from about 100 Ohm-cm to about $1\times10^{11}$ Ohm-cm.

DETAILED DESCRIPTION OF THE INVENTION

Figure 1A:
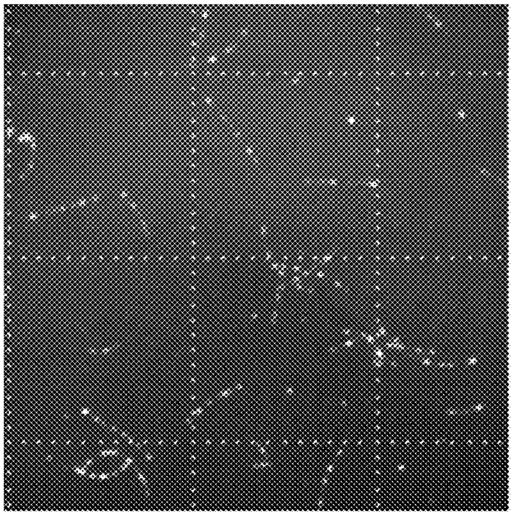
FIG. 1A is an image obtained for ActiveGrid® Ink GEN5 silver nanowires after about 16 hours heating at 200° C.

Composites have been formed with noble metal coated silver nanowires, in particular platinum coated nanowires, within a polymer matrix that provide a surprising number of desirable properties. Noble metal coated silver nanowire based polymer composites are described herein that reach an electron percolation threshold to provide good conduction at low metal loading levels. It is surprisingly found that noble metal, in particular platinum, coated nanowires can have dramatically improved electrical conductivity for an equivalent metal loading as compared to non-coated nanowires. The basis for the improved electrical conductivity for the platinum coated nanowires is unclear but could be related to the surface of the nanowires and the specific interactions with organic components in the composite, although Applicant does not want to be limited by theory. Thus, at surprisingly low metal loadings reasonable electrical conductivity can be achieved, such that the composite mechanical properties can be essentially similar to the polymer matrix itself. The noble coated silver nanowires have an added advantage of being more stable with respect to thermal treatments even at relatively modest (noble-metal) coating levels. These unexpected advantages point to potential expanded utility for noble metal coated silver nanowires for a range of applications that may be less desirable or impractical with silver nanowires that are uncoated or with other silver particulates, such as silver flakes or silver particles. Moreover, noble metals coatings can provide improved chemical resistance against oxidation and corrosion. These loaded polymer composites provide desirable materials as reinforced conductive adhesives and polymer composite materials where low to moderate electrical conductivity is desirable, but where the properties of composites with high loadings of metal are not suitable. The conductive composites can also be effective in transferring or dissipating heating.

In the structures described herein, the materials form three-dimensional structures. In other words, the materials are formed into structures with a significant thickness. Depending on the polymer, the resulting composites can be transparent or opaque since low metal loadings may not alter the polymer properties qualitatively. As described further below, silver nanowires have found significant use in forming thin transparent conductive films. To form highly transparent films, the metal nanowires are sparse, so that they do not cover most of the surface. For highly transparent films, a polymer binder basically provides consistent coating and stability for processing, so the volume percent nanowires is high, yet the coating maintains excellent optical properties since its typically in the nanometer range in terms of thickness. The highly transparent conductive films, with transmittance values of the conductive layer of at least about 90%, generally have a polymer overcoat to stabilize the structure once the conductive film processing is completed. In the thicker films, the metal nanowires are dispersed through a thicker polymer layer so that the volume percent of metal can be lower, potentially much lower, than in the sparse transparent films, but the total amount of metal may be comparable or higher for an area of the material on a surface, depending on the thickness. In these three-dimensional systems, the factors driving the reaching of a percolation threshold for achieving lower values of electrical resistance seem distinct from the roughly two-dimensional structure of the highly transparent films. In this context, percolation refers to the establishment of suitable electrical conduction pathways involving distinct conductive elements forming the structure. In some embodiments, it can be desirable to use lower loading levels to provide lower values of resistivity while providing the stability of the noble metal coatings. An intermediate system with lower transmittance values between 70% and 80% are described in U.S. Pat. No. 10,487,222 to de Zeeuw et al., entitled "Conductive Transparent Coating for Rigid and Flexible Substrates." incorporated herein by reference. The conductive coatings in the '222 patent have more than 60 wt % metal particles.

Polymers with relatively large loading of metallic particles can be used for making electrically conductive adhesives of polymer films and filler. Electrically conductive adhesives with a high loading level of metal particulates, generally greater than 75 weight percent, are presented in U.S. Pat. No. 9,589,693 to Dreezen et al., entitled "Electrically Conductive Adhesives," incorporated herein by reference. In general, for composites or adhesives to reach electrical conductivity using silver or carbon particles the loading needs to be considerable, >30 wt %. Metal loading is also helpful for improving thermal conductivity. Table 1 shows a comparison of general features for different conductive fillers.

TABLE 1

| | Fundamental Electrical and Loading | | Processing | Reliability | |
|---|---|---|---|---|---|
| Filler | Electrical Conductivity, ρ | Loading/Volume Fraction for Percolation | Viscosity at Percolation/ High, σ | Chemical Stability | Thermal and Humidity |
| Ag Particles (Flakes) | good | poor | poor | good | good |
| Carbon Nanotubes, Carbon Nanofibers | moderate | moderate | moderate | excellent | excellent |
| Graphite/ Carbon Black | poor | poor | poor | excellent | excellent |

TABLE 1-continued

| | Fundamental Electrical and Loading | | Processing | Reliability | |
|---|---|---|---|---|---|
| Filler | Electrical Conductivity, ρ | Loading/Volume Fraction for Percolation | Viscosity at Percolation/ High, σ | Chemical Stability | Thermal and Humidity |
| C3Nano AgNW | good | good | excellent | moderate | moderate |
| C3Nano Ag@Pt NW | good | excellent | excellent | good | good |

Silver nanowires have been successfully produced into high optical quality transparent conductive coatings with desirable mechanical properties, such as stretchability and stability against repeated folding and unfolding, while maintaining electrical conductivity. With respect to transparent coatings, the use of the nanowires to form transparent conductive coatings can have significant application in devices with displays and touch sensors. With higher metal loadings, reduced electrical resistance is found, while the transmittance of visible light is reduced. In some embodiments, transparent electrically conductive elements, e.g., coatings, based on metal comprise a sparse metal conductive layer. The conductive layers are generally sparse to provide desired amount of optical transparency through the conductive structure rather than around the conductive structure, so the coverage of the metal generally has significant, although microscopic, gaps over the layer of the conductive element. For example, transparent electrically conductive coatings can comprise metal nanowires deposited along a layer where sufficient contact can be provided for electron percolation to provide suitable conduction pathways. The one-dimensional morphology of nanowires is conducive to forming sparse metal conductive layers. In embodiments for transparent conductive layers, the transparent electrically conductive coating can comprise a fused metal nanostructured network, which has been found to exhibit desirable electrical, optical and mechanical properties. In the fused structure, unlike a corresponding unfused structure, electrons can conduct through the network instead of hopping (percolating) between separate nanowires. Conductivity referenced herein refers to electrical conductivity unless specifically indicated otherwise.

Applicant's application of the fusing process can be controlled to selectively deposit metal at junctions between the metal nanowires or to form a fused mass for less conductive structures regardless of the nanoparticulates. For forming fused metal nanostructured networks, the fusing process can be controlled to deposit a desired amount of silver associated with the junctions. The systems can be poised to provide for thermodynamic driving of the fusing to take place primarily at the junctions between neighboring metal nanowires that are components that are formed into the fused metal nanostructured network. Single solution approaches for the formation of fused metal nanostructured layers are described further in U.S. Pat. No. 9,183,968 B1 to Li et al, (hereinafter the '968 patent) entitled "Metal Nanowire Inks for the Formation of Transparent Conductive Films with Fused Networks," incorporated herein by reference. The processing described herein does not involve nanowire fusing.

The synthesis of thin silver nanowires is described in U.S. Pat. No. 10,714,230 B2 to Hu et al. (hereinafter the '230 patent), entitled "Thin and Uniform Silver Nanowires, Methods of Synthesis and Transparent Conductive Films Formed from the Nanowires," incorporated herein by reference. High quality silver nanowire products, with small uniform diameters and high purity, are desired for some applications for displays, but for less optically demanding applications, lower grade silver nanowires may be sufficient. For non-transparent composites, as described herein, nanowires with somewhat larger diameters that are lower cost to produce can provide desirable results, although thinner nanowires may provide a more dispersed system through the composite and may be desirable from a processing perspective depending on the length, rigidity, and other factors.

Applicant has previously described synthesis of noble metal coated silver nanowires suitable for large scale production. See, U.S. Pat. No. 9,530,534 to Hu et al. (hereinafter the '534 patent), entitled "Transparent Conductive Film," incorporated herein by reference. The noble metal coated nanowires were demonstrated to have improved stability in transparent conductive films under accelerated wear conditions with heat and humidity, for example, as shown in FIGS. 16 and 17 of the '534 patent.

Desirable methods for forming the metal coating on the silver nanowires can involve an improved version of galvanic replacement or the direct deposition of the coating metal. In controlled galvanic replacement, gold, platinum or other noble metal ions, which generally are provided as metal ion complexes in solution, oxidize silver in the wires while being reduced to the elemental noble metal at elevated temperatures. In the direct deposition, a reaction solution is formed with a dispersion of the silver nanowires, and a coating solution with the noble metal ions is gradually added to the reaction solution. The reaction solution is kept under reducing conditions. Hydrazine is a convenient reducing agent because the byproducts are nitrogen and water, although other reducing agents can be used. To obtain a uniform coating, the coating processes can be appropriately controlled. Control of the reaction, in addition to the possible use of strong coordinating ligands and/or a polymer capping agent, can involve the gradual addition of the metal ion complexes of the coating metal as a metal ion source solution into the reaction solution. The reactions can be conveniently performed in aqueous solution with optionally some alcohol or other cosolvents. The coordinating ligand can be included in the solution with the metal ions. The metal ions can be provided in suitable complexes, such as the $PtCl_6^{-2}$ complexes. As used herein, noble metals refer to metals having a standard reduction potential greater than silver, so these would include, gold, platinum, iridium, rhodium, palladium and osmium, with a particular interest in gold and platinum. The thickness of the noble metal coating can be adjusted generally during the deposition process. To achieve the remarkable electrical conductivity results observed herein as well as the stability with respect to various forms of degradation, the noble metal coating may be very thin, such as a monolayer or a few atomic layers of thickness.

In general, it is desirable for the metal nanowires to have an average diameter of no more than about 500 nm, in some embodiments no more than about 100 nm, in further embodiments no more than about 50 nm, and in other embodiments no more than about 30 nm. With respect to average length, nanowires with a longer length are expected to provide better electrical conductivity within a network. In general, the metal nanowires can have an average length of at least a micron, in further embodiments, at least 2.5 microns and in other embodiments from about 5 microns to about 100 microns, although synthesis techniques developed in the future may make longer nanowires possible. Nanowire dimensions can be reasonably controlled by adjusting synthesis parameters. Silver nanowires can be subjected to ultasonication to fragment the nanowires into smaller lengths if desired, and this can be performed prior to application of noble metal coating to avoid damage to the coating if desired. An aspect ratio can be specified as the ratio of the average length divided by the average diameter, and in some embodiments, the nanowires can have an aspect ratio of at least about 25, in further embodiments from about 50 to about 5000 and in additional embodiments from about 100 to about 2000. A person of ordinary skill in the art will recognize that additional ranges of nanowire dimensions within the explicit ranges above are contemplated and are within the present disclosure. The application of the noble metal coating does not qualitatively change the ranges of nanowire dimensions indicated above.

Using the direct deposition approach, a greater amount of noble metal can be deposited with a smooth coating and a stable silver metal core than can be obtained with galvanic exchange. In general, relative to the amount of silver, the noble metal coating can be no more than about 55 wt %, in further embodiments from about 0.03 wt % to about 40 wt %, and in additional embodiments from about 0.9 wt % to about 25 wt %. The amount of coated metal generally ranges from about 0.02 atomic percent (at %) to about 35 at %, in further embodiments from about 0.1 at % to about 25 at %, in additional embodiments from about 0.5 at % to about 20 at % as a fraction of the total coated nanowire. Assuming that the coating is uniform and has a bulk material density, the coating thickness can be roughly estimated from the weight amount of the coating and the average parameters of the initial nanowires. A person or ordinary skill in the art will recognize that additional ranges of coating amounts within the explicit ranges above are contemplated and are within the present disclosure.

The electrically conductive composites described herein provide another range of materials for use in devices using electrically conductive polymer type materials. Since the composites can exhibit good electrical conductivity at relatively low metal loadings, the composite can have properties substantially similar to the unloaded polymer. Since the composites can be formed using a broad range of polymers, the composites can similarly provide a corresponding broad range of mechanical properties. This flexibility in composite composition design provides a capability of forming a wide range of desirable composite compositions.

While the noble metal coated silver nanowires can provided significantly reduced electrical resistance at low to moderate loadings, it can be desirable to exploit the resistance to corrosion and other decay pathways due to the coating in embodiments where a low electrical conductivity is desired. In these embodiments, the concentration of the noble metal coated silver nanowires can be reduced, nanowire morphologies can be used with reduced conductivity and/or a polymer matrix can be selected to favor higher electrical resistance either due to intrinsic insulating properties and/or the nature of the interaction with the metal nanowires. These materials may be used for static discharge, grounding, or other suitable purpose.

The composite materials are suitable for the formation of resistive heaters. The amount of metal can be adjusted to provide balance on the amount of current used for a particular level of heating. The platinum coated nanowires can provide the advantage of being more heat tolerant so the heater can be used to achieve higher temperatures without damage to the heater. Since at lower loadings, the noble metal coated silver nanowires does not significantly alter the polymer properties with respect to the composite, a transparent polymer can be used to form a transparent heater element. For a heater element, the electrical resistance does not need to be too low. The conductive composites are suitable for a wide range of other applications relating to the use of electrically conductive adhesives and the like.

Composite Composition and Precursor Composition

The precursor composition is a depositable material that cures into the electrically conductive composite loaded with noble metal coated silver nanowires in a polymer matrix. Curing refers in a broad sense a process to transform the precursor composition into a solid mass of conductive composite. Curing can refer to a polymer crosslinking reaction, polymerization and/or solvent removal. Upon curing, the product is an electrically conductive composite material, which in some embodiments have remarkable electrical conductivity at relatively low metal loadings. The polymers can be formed with a wide range of suitable polymers, which may or may not be crosslinked following curing. Suitable process aides can be included in the precursor composition, for example, to facilitate deposition and/or the curing process.

The precursor composition can be a liquid/ink or paste that can be deposited appropriately for a suitable application. The curing process converts the precursor composition into a solid mass. The precursor compositions have the common feature of being depositable, either as a coating, a dispensable composition, a printed structure, extrudable material, spreadable paste, or the like, and the rheology of the composition can be selected depending on the deposition approach. The precursor composition generally comprises platinum coated nanowires and organic components, which optionally have volatile components. The organic components can comprise monomers, oligomers, polymers, dissolved polymer binders, volatile solvents, combinations thereof and the like.

Selection of the polymer generally depends on the use of the composite. The polymer selection is generally not limited as long as a dispersed and relatively uniform composite can be formed. Examples are described based on both hydrophilic and hydrophobic polymers. The use of silver nanowire loaded composites for forming adhesives is described in published U.S. patent application 2016/0177146A to Mun et al. (hereinafter the '146 application), entitled "Adhesive Film and Display Member Including the Same," incorporated herein by reference. The '146 application describes the use of polyacrylates, polymethacrylates or copolymers thereof with each other or distinct monomers. Other suitable thermoplastic polymers include, for example, polyamides, polyesters, polyethers, polyacetals, block polyester ether copolymers, acrylonitrile butadiene styrene copolymers, polyacrylates, polybutylene terephtalates, polyolefines. such as polyethylene and/or polypropylene (co) polymers, polyimides, polyarylene oxides, polyalkylene oxides, polystyrenes, polyethersulfones, polyurethanes, epoxy, as well as mixtures, copolymers or blends thereof. The formation of silver nanowire composites for non-adhesive coatings is described in Cortes et al., "High-performance thermoplastic composites poly(ether ketone ketone)/silver nanowires: Morphological, mechanical and electrical properties," Journal of Non-Crystalline Solids, 2014, vol. 391, pp. 106-111, incorporated herein by reference.

In some embodiments, a polymer precursor of the precursor composition can act as a non-volatile solvent. Generally, the precursor compositions can comprise no more than about 40 wt % optional, volatile solvent. Correspondingly, the precursor compositions can comprise from about 60 wt % to 100 wt % nonvolatile organic components as a fraction of the organic portion of the precursor compositions. Suitable solvents should be compatible with dissolving the components of the polymer precursor and with dispersion of the noble metal coated nanowires. Some monomers or oligomers can be suitable as non-volatile solvents. Volatile solvents can have low boiling points or high boiling points. Low boiling solvents, such as ethanol, isopropanol, or the like, can consume less energy to ultimately remove the solvents than a high boiling temperature such as ethylene glycol or other polyols. The amount of volatile solvent can be selected based on the character of the polymer precursor, such as to provide solubility for the polymer precursor, as well as to be compatible for the desired processing approach, for example, to adjust the viscosity or other relevant property. Since the noble metal coated silver nanowires can be compatible with a wide range of polymers and since the noble metal coated nanowires are generally included in a relatively low volume percent, the precursor compositions can generally be processed following formation of the precursor composition similar to the unfilled polymer, which are generally known in the art.

The loading amount of metal nanowires, noble metal coated silver nanowires, can be driven by various parameters, such as target electrical conductivity, mechanical properties, cost and processability. At a sufficient level of loading, the metal nanowires cross a so-called percolation threshold, where there is a steep increase in conductivity and a corresponding drop in resistance. After a range of steep increase in conductivity, the increases of conductivity with increasing loading may exhibit a relatively smaller slope. It may or may not be desired for the metal nanowire loading to be above the percolation threshold. In general, for the embodiments of interest herein, the metal loading in the polymer composite can be no more than about 40 wt %, in some embodiments from about 0.001 weight percent (wt %) to about 30 wt %, in further embodiments from about 0.01 wt % to about 20 wt %, in some embodiments from about 0.0025, to about 15 wt %, and other embodiments from about 0.1 wt % to about 10 wt %. It should be appreciated that the upper and lower limits of these ranges can be exchanged, such as from about 0.01 wt % to about 10 wt %. If the conductive precursor composition has volatile components or releases other volatile by-products during curing, the precursor composition has a correspondingly lower metal nanowire concentration relative to the metal nanowire concentration in the cured composite based on scaling the organic contribution accordingly. Equivalent loadings can also be provided in terms of volume percent (based on the densities of the nanowires and resin/polymer system). In general, the metal loading in the polymer composite can be no more than about 10 vol %, in some embodiments from about 0.0001 volume percent (vol %) to about 10 vol %, in further embodiments from about 0.001 vol % to about 5 vol %, and other embodiments from about 0.01 vol % to about 2 vol %. As described below, for some applications, it is desirable for the conductive composite to have higher values of resistivity. For these embodiments, the noble metal coated silver nanowires can be in the composite at concentrations no more than about 10 wt %, in some embodiments no more than about 2 wt %, in other embodiments no more than about 0.1 wt %, and in further embodiments no more than about 0.025 wt %, and in other embodiments no more than about 0.01 wt %, while achieving a resistivity value of no more than about $1\times10^{11}$ Ohm-cm. A person of ordinary skill in the art will recognize that additional ranges of nanowire loading within the explicit ranges above are contemplated and are within the present disclosure.

Metal nanowires, including noble metal coated silver nanowires, generally should remain wet to avoid forming a state where the nanowires cannot be redispersed. Due to their relative fragility, ultrasonication generally cannot be used to disperse aggregated metal nanowires since the nanowires can fragment into pieces, so the metal nanowires are generally processed from a dispersed state to form well blended materials. As noted above, ultrasonication can be used selectively to form shorter nanowires by fragmentation. The exemplified processing involves introduction of dispersed metal nanowires at dilute concentrations. Applicant has recently discovered processing approaches to form metal nanowire dispersions at significantly higher concentrations depending on the metal nanowire dimensions. See copending U.S. provisional patent application 63/459,495 to Virkar et al. (hereinafter the '495 application), entitled "High Loadings of Silver Nanowires: Dispersions and Conductive Pastes; And Corresponding Methods," incorporated herein by reference, now included in U.S. patent application publication 2024/0343923 A1. The use of higher concentration dispersions of noble metal coated nanowires may introduce some processing flexibility, although the use of lower concentration nanowire dispersions can be suitable for forming comparable composites with appropriate solvent removal at a convenient time in processing. Generally, though a dispersion of noble metal coated silver nanowires is blended with the organic components and well mixed to form the precursor composition. Depending on the scale of the processing, suitable sizes of commercial mixers are commercially available.

The results presented herein are based on loading metal nanowires into a polymer matrix. Other metallic, carbon based, or other filler materials and particles (non-wire) can be added with the noble metal coated silver nanowires to provide increased conductivity (electrical and/or heat) and possibly desired mechanical properties to the final composite. In some embodiments, the composite material is substantially free of other conductive metal particulates and/or other carbon based conductive particulates, although some amount of metal particulate contaminants are generally present with metal nanowires. Other particulates can be other metal particles, such as metal nano-particulates other than metal nanowires or carbon particles, such as graphite particles, carbon blacks, graphene sheets, fullerenes, carbon nanotubes, carbon nanofibers or the like. Suitable conductive additives include, for example, silver nanoparticles and/or silver flakes. The amount of other electrically conductive additives is not particularly restricted, but generally they are no more than about 5 times the nanowires on a weight percent basis and in other embodiments no more than about 2 times, in further embodiments no more than about the weight percent of the metal nanowires, and in some embodiments, no more than about 0.5 times the nanowire weight percent. A person of ordinary skill in the art will recognize that additional ranges of added conductive particles within the explicit ranges above are contemplated and are within the present disclosure.

As noted above, the precursor composition can comprise additional components or additives, which can be referred to as process aids with the understanding that this can broadly cover a wide range of compositions covering a corresponding wide range of functions. In some embodiments, the precursor compositions can generally comprise up to about 10 wt % process aids, such as crosslinking agents, viscosity modifiers, plasticizers, hardeners (copolymer constituents), surfactants, or the like. Crosslinking agents can be thermal or UV initiators, crosslinking reactants, or the like. The selection of processing aids is generally strongly influenced by the selection of polymers and the corresponding deposition approach to be used.

In general, any processing approach that provides for forming a good blend of the polymer with the nanowires can be appropriate. The metal nanowires generally remain dispersed in a liquid for processing to avoid agglomeration. The metal nanowires are generally dispersed in polar solvents like alcohols or water, but while not being limited by theory, dispersions in other solvents can be possible depending on the nature of the surfactants, dispersants and other components. Solution processing generally is a convenient approach if a suitable solvent is available for the polymer or polymer precursor as well as a dispersion of the nanowires. In general, for nanowire suspensions, suitable solvents include, for example, water, alcohols, ketones, esters, ethers, such as glycol ethers, aromatic compounds, alkanes, and the like and mixtures thereof. Specific solvents include, for example, water, ethanol, isopropyl alcohol, isobutyl alcohol, tertiary butyl alcohol, ethylene glycol, triethylene glycol, methyl ethyl ketone, glycol ethers, butyl carbitol (diethylene glycol butyl ether), methyl isobutyl ketone, toluene, hexane, ethyl acetate, butyl acetate, ethyl lactate, PGMEA (2-methoxy-1-methylethylacetate), mixtures thereof, or the like. Furthermore, mixtures of solvents, polymers or monomers and nanowires can be made, and the solvents can be removed to form nanowire-resin system which can be further processed.

To form the conductive composite composition, the precursor composition (nanowire-polymer precursor blend) can be deposited and then cured to create a conductive composite. Various coating approaches can be suitable, such as slot coating. Spray coating may be suitable with a larger orifice nozzle to account for the nanowire length. Paste precursor composition can be placed and spread appropriately for the application, such as by extrusion. Volatile solvent concentrations as well as other process aids can be adjusted appropriately to facilitate deposition while achieving a target conductive composite composition. Lower boiling temperature solvents can be used if at least some solvent evaporation is desired during deposition, and higher boiling temperature solvents can be used if most of solvent removal takes place during curing.

The curing can be achieved by a variety of means including, but not limited to, by heat, radiation, chemically, exposure to water or oxygen, which may be ambient, or a combination thereof. Various commercial polymers crosslink in response to ultraviolet (UV) radiation. UV radiation can be correspondingly applied during the curing step. Solvent can also be removed after the deposition step (e.g., with heat, reduced pressure, and/or blowing). Suitable temperatures can depend on the polymer and are usually below 250° C., and heating times can depend on whether or not the polymer is thermally crosslinking as well as how much solvent removal is taking place. In some embodiments, the polymer matrix is formed by a binder polymer that is dissolved with solvent during deposition and which forms a solid polymer matrix following solvent removal. The polymer concentration can be selected to give the desired metal nanowire loading. In other embodiments, the polymer (e.g., a thermoplastic polymer) can be processed as a melt, and the metal nanowires blended with the melted polymer. Solvent associated with the noble metal coated silver nanowire dispersion may evaporate during the blending with the melt. The temperature of the metal should be below temperatures at which the metal nanowires are damaged. The blended polymer melt can be extruded, cast or molded to form the resulting composite upon cooling.

Conductive Composite Compositions, Properties and Applications

Following curing, the conductive composite composition forms at the location of the precursor deposition. The overall organic composition of the conductive composite can change based on a loss of volatile components of the precursors as well as any reactions that take place during the curing. For example, a polymerization reaction and/or a curing reaction may involve generation of gaseous or volatile by-products based on the particular chemistry. The noble metal coated silver nanowires become embedded in the solid polymer matrix following curing. The resulting properties of the composite follow from the composite composition.

Under appropriate curing conditions, the noble metal coated silver nanowires are generally not significantly changed during curing, although surface interactions with various polymer components, such as dispersants, may or may not be altered. The mechanical properties of the composite may be influenced to varying degrees depending on the metal loading levels. At low loading levels, the mechanical properties are dominated by the polymer matrix. At higher loading levels in the ranges expressed herein, the mechanical properties are altered to reflect the metal presence, which depends on the interactions of the polymer with the metal. At higher metal loadings, the thermal conductivity of the composite should be significantly higher than reflected by the polymer matrix alone.

Ranges in weight percent and volume percent for the noble metal coated silver nanowires in the conductive composite composition are presented above. The remaining weight and volume of the composite can be organics as well as optionally other property modifying inorganics. For example, inorganic particles, such as silica, alumina or carbon fibers, can be added to increase the mechanical strength of the composite. Other inorganic or organic compositions can be added to change the color. Generally, other property enhancing additives can comprise up to about 10 vol %, other in some particular embodiments, greater amounts can be used. The polymer matrix comprises the remainder of the composite structure. The polymer matrix can comprise one or more chemically crosslinked polymers and may comprise uncrosslinked polymer binders that have entangled polymer chains that effectively form reversible physical crosslinks that are stable as long as the polymer is not dissolved or melted.

As demonstrated in the Examples below, the noble metal coated silver nanowires exhibit remarkable conductivity at low concentrations. While silver nanowires themselves can provide very good electrical conductivity, at low concentrations the noble metal coated silver nanowires exhibit conductivities many orders of magnitude greater than corresponding silver nanowire loaded systems. Since the bulk conductivities are essentially equivalent, this lower concentration dramatic increase in conductivity can provide great number of options in material design for lower and moderate conductivity applications. Due to the ability to introduce low concentrations of conductive fillers the composite mechanical properties can track significantly more closely to the mechanical properties, such as adhesion, cohesion, mechanical strength, elongation, modulus, and the like, of the unfilled polymer matrix. Since a wide range of polymer matrix materials are suitable, the conductive composite composition can provide desirable electrical conductivity properties over a wide range of mechanical properties.

Resistivity can also be called volume resistivity and is equal to R A/L, where R is the resistance in Ohms, A is the area of the conductive material, and L is the length of electrical conduction along the conductive element. If A and L are in units of centimeters, resistivity p has units of Ohm-cm. The bulk resistivity of silver is reported to be $1.59\times10^{-6}$ Ohm-cm, and for platinum it is about $1.09\times10^{-5}$ Ohm-cm. Since the bulk resistivity of platinum is greater than for silver, the most electrically conductive metal, the effect of the noble metal coating is not related to the bulk resistivity properties. As loading of metal is increased, the increased conductivity, reduced resistivity, of the noble metal coated silver nanowires diminishes and ultimately becomes irrelevant, for load atomic percent noble metal coating, or inverted, reduced conductivity relative to silver nanowires if the atomic percent of noble metal coating is significant. At lower nanowire loadings the resistivities of composites with noble metal coated silver nanowires can have resistivity values lower by a factor of at least about 100, in further embodiments at least about 1000, in additional embodiments at least about $1\times10^4$, in some embodiments at least about $1\times10^5$, and in other embodiments at least about $1\times10^6$ relative to the resistivities of the composites loaded with silver nanowires, in other words where this is the ratio of the resistivity of the composite with silver nanowires divided by the resistivities of composites loaded with noble metal coated silver nanowires. At even larger ratios, the electrical properties become difficult to measure, so the ultimate boundaries cannot be accurately determined. As suggested above, the examples are consistent in that the decreased electrical resistance of the noble metal coated silver nanowires relative to the electrical resistance using silver nanowires becomes more and mor pronounced as the metal loading decreases.

At higher metal loadings, the bulk metal conductivity is a limit on the achievable electrical conductivity, and generally the conductivity can be a reasonable factor less than the bulk conductivity value. As loading levels decrease, the resistivity of the composites with noble metal coated silver nanowires drops dramatically more slowly relative to the conductivity of composites with silver nanowires as loading levels decrease. This distinction becomes especially dramatic at loading levels below about 10 wt %. This can be considered in terms of the parameter described in the last paragraph involving the ratios of the two resistivities. For example, if resistivity values on the order of $10^2$ to $10^{-3}$, the use of noble metal coated silver nanowires can provide for the use of considerably lower loading levels with proper processing and polymer selection.

For a heater application, the heat generated can be described in terms of a surface power density, which can be evaluated as, $$P_d=V^2/(R\cdot A),$$

where V is the voltage, R is the resistance and A is the area of the heater. If V is in volts and R is in Ohms, Pa is in watts divided by the units of A. Applicant has previously described the formation of transparent heaters using thin, fused metal nanostructured networks based noble metal coated silver nanowires. See copending provisional patent application 63/441,656 to Chen et al., entitled “Stable Thin Film Heaters Based on Noble Metal Coated Silver Nanowires and Applications Thereof,” incorporated herein by reference, now included in U.S. patent application publication 2024/0260144 A1. As previously demonstrated, noble metal coated silver nanowires can exhibit greater than about 0.5 $W/cm^2$ (2000 $W/m^2$), in some embodiments greater than about 0.6 $W/cm^2$, and in some embodiments at least about 1 $W/cm^2$. Using the composite materials described herein, similar values of resistance times area can be achieved to provide comparable surface power density with a stable thicker structure. These heater elements can be used for transparent or opaque heaters. These structures can provide an alternative to the thin transparent heaters using the fused metal nanostructure network, where each alternative may provide advantages in different contexts.

In some embodiments, it is desirable to have lower conductivity for certain applications. In particular, for electrostatic discharge, anti-static or grounding purposes, suitable resistivities can be from about $10^2$ to $10^{11}$ Ohm-cm, while values lower than $10^2$ Ohm-cm can be considered conductive. Depending on the particular use of the material, the resistivity can be selected accordingly. Thus, in some application the resistivity can be from 100 to $10^8$ Ohm-cm while in other applications the desired resistivities can be from about $10^6$ to about $10^{11}$ Ohm-cm. A person of ordinary skill in the art will recognize that additional ranges within these explicit resistivity ranges are contemplated and are within the present disclosure. The concentrations of noble metal coated silver nanowires can be reduced until the desired range of resistivity is reached. In addition, other features of the composite can be selected to contribute to low conductivity of the composite. For example, electrically insulating adhesives can be used for the polymer matrix. For example, electrically insulating epoxies, silicones, polyurethanes, polysulfides, cyanoacrylates are available from Masterbond® and DuPont. Due to a reduced slope of resistivity as a function of nanowire concentration over a broader range of concentrations, composite compositions can be used effectively to target higher values of resistance within target ranges. The particular loading level can depend on the polymer and potentially on the presence of any additives.

Experiments have been performed to form polymer composites with silver nanowires both with or without platinum coating. The results are presented in the Examples. The results demonstrate increased electrical conductivity and thermal stability for silver nanowires with a platinum coating.

EXAMPLES

General Materials and Methods

Silver nanowires (Ag NW) used in the examples below were available as components in ActiveGrid® Inks from Applicant C3Nano, Inc. The ActiveGrid® Inks included GEN5 silver nanowires about 20-22 nm in average diameter, GEN7 silver nanowires about 18 nm in average diameter, and GEN8 ActiveGrid® Ink with silver nanowires of average diameter of <16 nm. Preparation of these nanowires is described in the ’230 patent cited above. The platinum coated silver nanowires (Ag@Pt NW) were prepared using GEN5 silver nanowires which were coated with platinum using the direct deposition method as described in U.S. Pat. No. 9,530,534 B2 to Hu et al. and U.S. Pat. No. 10,714,230 B2 to Hu et al. The platinum coating may comprise approximately one or a few monolayers of platinum on the silver nanowires.

Dilute, good dispersions of the nanowires were blended with either monomer or polymer for forming the composites. For some examples, the nanowires were blended with ethoxylated (20 mol %) trimethylolpropane triacrylate monomer (AM1). Polymerization of AM1 was initiated using a blend of 3 UV photoinitiators (PIs) and this PI blend is called MP8. For some examples, the nanowires were blended with polymers such as polylactic acid (PLA). When blending the nanowires with polymer, the polymer was dissolved in a suitable solvent and mixed with the nanowire dispersion, and the solvent was removed by heat and/or under vacuum. For nanowires blended in PLA, for example, chloroform was used as solvent for the polymer. The nanowires can be dispersed in alcohol or aqueous alcohol for processing.

Composites comprising the nanowires blended with monomer and photoinitiator were prepared by wetting a glass slide with the blend, followed by placing a second glass slide on top such that a wet film was formed between the two glass slides. The samples were subjected to UV light by passing three times through a Fusion UV System delivering an energy density of 1.8 J/cm$^2$ per pass. After the composite is cured, it can be removed from the glass slides. For nanowire-PLA composite, thin films were formed by placing the dispersion of nanowire-PLA-solvent in a flat-bottom glass container and the solvent removed by evaporation under ambient conditions. The film can be lifted off the glass surface for evaluation.

Composites were evaluated by measuring resistance using a two-point probe method using Silver Conductor Paste (DuPont™ PE828) as the trace electrode to make electrical connection; the silver paste was roughly ~ 1-3 cm in length and the channel length was ~ 0.2-1.0 cm in width. Copper foil tape (3M™ Copper Foil Shielding Tape 1182) was also applied onto a surface of the samples to help provide a guide and template for the silver paste. The samples were then heated at 80° C. for 40 minutes to cure the paste. The resistance of each composite was measured using an electronic multimeter equipped with a pair of probes.

Example 1—Thermal Behavior

Figure 1B:
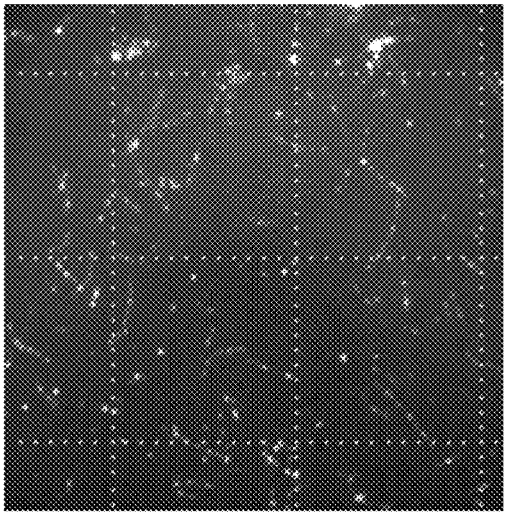
FIG. 1B is an image obtained for ActiveGrid® Ink GEN7 silver nanowires after about 16 hours heating at 200° C.
Figure 1C:
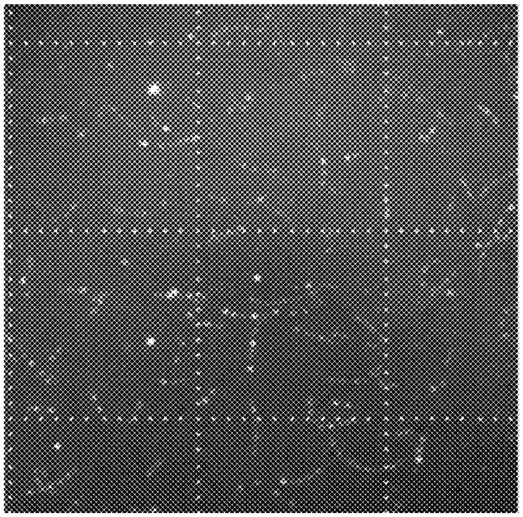
FIG. 1C is an image obtained for ActiveGrid® Ink GEN8 silver nanowires after about 16 hours heating at 200° C.
Figure 1D:
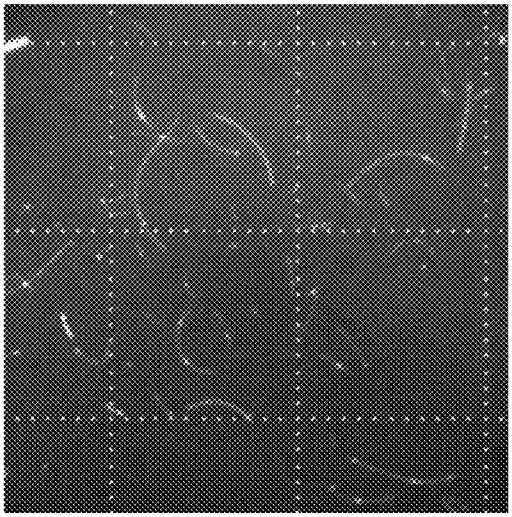
FIG. 1D is an image obtained for platinum-coated GEN5 silver nanowires after about 16 hours heating at 200° C.

The thermal behavior of Ag NW and Ag@Pt NW were investigated. Dilute solutions of the nanowires were prepared and dropped onto glass slides. The samples were heated and images were taken at hour intervals using 1000× magnification and 150-160 msec exposure settings. Results for samples heated at 150° C. are summarized in Table 2. Results for samples heated at 200° C. are summarized in Table 3. FIGS. 1A-1C show images obtained after about 16 hours heating at 200° C. for GEN5, GEN7 and GEN8 silver nanowires, respectively, and FIG. 1D shows an image obtained for platinum-coated GEN5 silver nanowires. While the term melted is used in Table 3, some combination of melting, fragmentation and oxidation was observed.

TABLE 2

| Time (h) | Ag NW GEN5 | Ag NW GEN7 | Ag NW GEN8 | Ag@Pt NW (GEN5) |
|---|---|---|---|---|
| 0 | solid | solid | solid | solid |
| 1 | solid | solid, some beading | solid | solid |
| 2 | solid, some beading | solid, some beading | solid, some beading | solid |
| 3 | solid, some beading | solid, some beading | solid, some beading | solid |

TABLE 3

| Time (h) | Ag NW GEN5 | Ag NW GEN7 | Ag NW GEN8 | Ag@Pt NW (GEN5) |
|---|---|---|---|---|
| 0 | solid | solid | solid | solid |
| 1 | solid | solid | some degradation | solid |
| 2 | degradation into segments | some degradation beading and segments | significant degradation | solid |
| 4 | degradation and some beading | Significant degradation | significant degradation | solid |
| ~16 | degradation and lots of beading | significant degradation | significant degradation | minor degradation, NWs in tact, minimal beading |

Example 2—AgNW and Ag@Pt NW Composites Formulated with Hydrophilic Triacrylate Monomer AM1

Formulations including GEN5 silver nanowires and platinum-coated GEN5 silver nanowires were prepared by combining 0.2 g or 0.35 g of each nanowire with 10 g of triacrylate monomer AM1 and 20 mg of photoinitiator blend MP8. After UV curing, the top glass slide was removed, and the composite structures released from the bottom glass slide. The resulting composites were reddish-brown in color with composites prepared with the platinum-coated nanowires being darker than those prepared with the uncoated nanowires. Thicknesses of the composite structures ranged from about 110 to about 120 microns. Resistance was measured for each of the composites and results are shown in Table 4.

The results shown in Table 4 indicate that platinum-coated silver nanowires are much more conductive as compared to uncoated silver nanowires. Composites prepared with a 2.0 wt % NW loading can achieve a resistance below 10 Ohms when platinum-coated nanowires were used, as compared to MegaOhms (MOhms) for the uncoated silver nanowires.

TABLE 4

| | | Resistance (Ohms)[1] | | Resistance Replicate (Ohms)[1] | |
|---|---|---|---|---|---|
| Composite | % Ag | Sample 1 | Sample 2 | Sample 1 | Sample 2 |
| 1a (Ag@Pt) | 3.5 | 1.92 | 1.26 | 1.7 | 5 |
| 1b (Ag) | 3.5 | $27 \times 10^6$ | $40 \times 10^6$ | 24 × 106 | 66 × 106 |
| 2a (Ag@Pt) | 2.0 | 6.2 | 6.2 | 32 | 47 |
| 2b (Ag) | 2.0 | $90 \times 10^6$ | $120 \times 10^6$ | — | — |

[1]MOhms readings unstable

Example 3—AgNW and Ag@Pt NW Composites Formulated With PLA

Composites C1, C2, X1 and X2, including GEN5 silver nanowires and platinum-coated GEN5 silver nanowires, were prepared by combining with 10 g of PLA with 0.2 g of each nanowire respectively, as shown in Table 5. The weight percent of the nanowires in the composite was about 2 wt %. The composites were cut to different sizes and thicknesses were measured. For each sample, resistance was measured at an initial time (R0), and subsequently at day intervals for up to three days (R1, R2 and R3). The samples were held at 85° C. with 85% relative humidity. Thus, this example also tests composite stability under accelerated wear testing conditions. Commercial testing apparatuses that provide for control of the heat and humidity include, for example, ESPEC Model BTL-433 Environmental Chamber (ESPEC Corp. North America, Inc. Hudsonville, MI, USA) or Thermotron SM-3.5-3800 Benchtop Environmental Chamber (Thermotron Inc., Holland, MI, USA). Results are shown in Table 5.

PLA/Ag samples C1 and C2 gave very high resistance while PLA/Ag@Pt samples (X1 and X2) show high conductivity when using ~2 wt % nanowire loading. It can also be noted that the PLA/Ag@PtNW composite film samples gained conductivity with the treatment at 85° C. and 85% relative humidity. Likely the percolated network underwent some polymer reorganization and enhanced wire-to-wire contact under the high humidity-high temperature conditions.

TABLE 5

| Composite/ | Size, 1 × w | Thickness | Resistance (Ohms) | | | |
|---|---|---|---|---|---|---|
| Film | (cm) | (microns) | R0 | R1 | R2 | R3 |
| Composite C1 (PLA/Ag) | 3 × 2 | 70 | OL[1] | OL | 160-350 × $10^6$ | OL |
| Composite C2 (PLA/Ag) | 2.5 × 1.5 | 50 | OL | OL | 531 × $10^6$ | OL |
| Composite X1 (PLA/Ag@Pt) | 3 × 2 | 72 | 17.46 | 7.81 | 2.66 | 2.55 |
| Composite X2 (PLA/Ag@Pt) | 2.5 × 1.5 | 58 | 10.94 | 13.05 | 2.81 | 2.52 |

[1]OL = Open Loop, values too large to measure with meter.

Composites M1, M2, N1 and N2, including GEN5 silver nanowires and platinum-coated GEN5 silver nanowires, were prepared by combining 0.2 g of each nanowire with 10 g of PLA as shown in Table 6. The weight percent of the nanowires in the composite was about 2 wt %. The composites were cut to different sizes and thicknesses were measured. Resistance was measured at an initial time (R0) and after one day (R1). The samples were held at 150° C. under dry conditions. Results are shown in Table 6. The results show that the composite films are stable to the high temperature treatment.

TABLE 6

| | Size, 1 × w | Thickness | Resistance (Ohms) | |
|---|---|---|---|---|
| Composite/Film | (cm) | (microns) | R0 | R1 |
| Composite M1 (PLA/Ag) | 3 × 1 | 72-90 | 25M | 72-77M |
| Composite M2 (PLA/Ag) | 3.5 × 1 | 72-91 | OL[1] | OL |

TABLE 6-continued

| | Size, 1 × w | Thickness | Resistance (Ohms) | |
|---|---|---|---|---|
| Composite/Film | (cm) | (microns) | R0 | R1 |
| Composite N1 (PLA/Ag@Pt) | 2.5 × 1 | 220-280 | 1.48 | 1.59 |
| Composite N2 (PLA/Ag@Pt) | 3 × 1 | 220-281 | 1.47 | 1.58 |

[1]OL = Open Loop, values too large to measure with meter.

Example 4—AgNW and Ag@Pt NW Composites Formulated with AM1 and PLA

Composites including GEN5 silver nanowires and platinum-coated GEN5 silver nanowires were prepared by combining the nanowires with AM1 or PLA as shown in Table 7. Composites prepared with AM1 were UV-cured as described above. Resistance was measured for each of the coatings and results are shown in Table 7.

TABLE 7

| Composite/Film | Loading (vol %) | Polymer/Resin System | Resistivity, ρ (Ohm-cm) |
|---|---|---|---|
| 3a (Ag) | ~0.3 | AM1 | 103-104 |
| 3b (Ag) | ~0.4 | PLA | 0.01-10 |
| 4a (Ag@Pt) | ~0.25 | AM1 | 0.01-1.0 |
| 4b (Ag)@Pt | ~0.25 | PLA | 0.01-0.1 |

Example 5—Ag@Pt NW Composite Formulated with AM1

Composite 5a was prepared by combining Ag@Pt NW and AM1 such that the normalized loading was 1.5×. Composite 5a was used to form a coating having a thickness of about 200 micron. Resistivity was measured and the result is shown in Table 8.

TABLE 8

| Composite/ Film | Normalized Loading (wt %/vol %) | "Real" Composite Resistivity ρ (Ohm-cm) | Conductivity Improvement | >Percolation Threshold |
|---|---|---|---|---|
| 5a | 1.5x | 0.25 | 35,000 | yes |

Example 6—Effect of Ag Paste and Cu Tape on Conductivity

Composites 6 and 7a-7c were prepared by combining GEN5 silver nanowires and platinum-coated GEN5 silver nanowires with AM1 as shown in Table 9. Coatings of the composites were prepared as described above. For each sample, resistance was measured at an initial time (R0), and subsequently at day intervals for up to two days (R1 and R2). The coatings were then configured with copper foil tape and/or silver paste to provide electrical connection. The resistance of each configuration was measured and results are shown in Table 9.

TABLE 9

| Composite/Film | % Ag | Thickness (microns) | Electrical Connection | Resistance (Ohms) R0 | R1 | R2 |
|---|---|---|---|---|---|---|
| 6 (AM1/Ag) | 3.5 | ~130 | Cu tape | 212-260M | | |
| | | | Ag paste | 167M | 66M | 47.9M |
| | | | Cu tape + Ag paste | 74.2M | 24.2M | 14.7M |
| 7a (AM1/Ag@Pt) | 2.0 | ~80 | Cu tape | 2.0-43k | | |
| | | | Cu tape + Ag paste | 32 | 95 | 93 |
| 7b (AM1/Ag@Pt) | 2.0 | ~85 | Cu tape | 2.2-4.6k | | |
| | | | Cu tape + Ag paste | 47 | 21 | 23 |
| 7c (AM1/Ag@Pt) | 3.5 | ~110-120 | Cu tape | 0.6-38k | | |
| | | | Ag paste | 6.09 | 5.02 | 4.72 |
| | | | Cu tape + Ag paste | 1.85 | 1.65 | 11.6 |

Example 7—Applied Voltage Heating

Coatings of composite 7c were prepared and configured with either only copper foil tape or a combination of silver paste and copper foil tape to provide electrical connection. The coatings were heated over a voltage range of from 1V to 4V with amperage set to 2. No temperature change was observed for the coating configured with only copper foil tape. A temperature change of about 10° C. was observed for the coating configured with the combination of silver paste and copper foil tape. Initial resistance (at 1V) was about 14.5 Ohms and final resistance (at 4V) was about 17.7 Ohms.

Further Inventive Concepts

A1. A composite precursor composition comprising noble metal coated silver nanowires and polymer precursor composition, the polymer precursor composition being monomers, oligomers, a solid polymer dissolved in solvent, or a combination thereof, wherein the solid content of the composite precursor composition comprises from about 0.01 wt % to about 40 wt % noble metal coated silver nanowires.

A2. The composite precursor composition of inventive concept A1 wherein the solid content of the composite precursor composition comprises from about 0.1 wt % to about 20 wt % noble metal coated silver nanowires.

A3. The composite precursor composition of inventive concept A1 wherein the noble metal coated silver nanowires comprise platinum coated silver nanowires, and the solid content of the composite precursor composition comprises from about 0.5 wt % to about 10 wt % of the platinum coated nanowires.

A4. The composite precursor composition of inventive concept A1 wherein the noble metal coated silver nanowires have an average diameter of 100 nm or less.

A5. The composite precursor composition of inventive concept A1 wherein the solid content of the composite precursor composition comprises at least about 90 wt % of the polymer precursor composition.

A6. The composite precursor composition of inventive concept A1 further comprising a volatile solvent.

A7. The composite precursor composition of inventive concept A1 wherein the composite precursor composition can be cured to form a composite material having a resistivity of no more than about 100 Ohm-cm.

A8. The composite precursor composition of inventive concept A1 wherein the composite precursor composition can be cured to form a composite material having a resistivity of no more than about 1 Ohm-cm.

A9. The composite precursor composition of inventive concept A1 wherein the composite precursor composition further comprises other metal particulates in an amount no more than about the weight of the noble metal coated silver nanowires.

A10. The composite precursor composition of inventive concept A1 wherein the composite precursor composition can be cured to form a solid material by heating, exposing to radiation, chemical treatment, exposure to water or oxygen, or a combination thereof.

A11. The composite precursor composition of inventive concept A1 wherein the solid content of the composite precursor composition comprises no more than about 2.0 wt % noble metal coated silver nanowires.

A12. The composite precursor composition of inventive concept A1 wherein the solid content of the composite precursor composition comprises no more than about 0.1 wt % noble metal coated silver nanowires.

A13. The composite precursor composition of inventive concept A1 wherein the noble metal coated silver nanowires comprise platinum coated silver nanowires.

A14. The composite precursor composition of inventive concept A1 wherein the noble metal coated silver nanowires have an average diameter of 100 nm or less.

A15. The composite precursor composition of inventive concept A1 wherein the solid content of the composite precursor composition comprises at least about 90 wt % of the polymer precursor composition.

A16. The composite precursor composition of inventive concept A1 wherein the composite material comprises other metal particulates in an amount no more than about the weight of the noble metal coated silver nanowires.

A17. The composite precursor composition of inventive concept A1 wherein the composite precursor composition can be cured to form a composite material having a resistivity from about 100 Ohm-cm to about $1\times10^{11}$ Ohm-cm.

A18. The composite precursor composition of inventive concept A1 wherein the composite precursor composition can be cured to form a solid material by heating, exposing to radiation, chemical treatment, exposure to water or oxygen, or a combination thereof.

B1. A method for forming a composite precursor composition, the method comprising blending a dispersion of noble metal coated nanowires and a polymer precursor composition to form a well mixed blend, the polymer precursor composition being monomers, oligomers, a polymer dissolved in solvent, or a combination thereof, wherein the solid content of the composite precursor composition comprises from about 0.01 wt % to about 40 wt % noble metal coated silver nanowires.

B2. The method of inventive concept B1 wherein the well mixed blend comprises a volatile solvent and the method further comprises removing at least a portion of the volatile solvent to obtain a desired solids content of the composite precursor composition.

B3. The method of inventive concept B1 wherein the composite precursor composition can be cured to form a composite material having a resistivity of no more than about 100 Ohm-cm.

B4. The method of inventive concept B1 wherein the composite precursor composition can be cured to form a composite material having a resistivity of no more than about 1 Ohm-cm.

B5. The method of inventive concept B1 wherein the solid content of the composite precursor composition comprises no more than about 2.0 wt % noble metal coated silver nanowires.

B6. The method of inventive concept B1 wherein the composite precursor composition can be cured to form a composite material having a resistivity from about 100 Ohm-cm to about $1\times10^{11}$ Ohm-cm.

B7. The method of inventive concept B1 wherein the composite precursor composition is any of the composite precursor compositions of claims A1 to A18.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein. To the extent that specific structures, compositions and/or processes are described herein with components, elements, ingredients or other partitions, it is to be understand that the disclosure herein covers the specific embodiments, embodiments comprising the specific components, elements, ingredients, other partitions or combinations thereof as well as embodiments consisting essentially of such specific components, ingredients or other partitions or combinations thereof that can include additional features that do not change the fundamental nature of the subject matter, as suggested in the discussion, unless otherwise specifically indicated. The use of the term "about" herein refers to the understanding of a person of ordinary skill in the art in the particular context, which may involve measurement error and/or reporting precision as would be understood by a person of ordinary skill in the art in the context for the particular parameter unless explicitly indicated otherwise.

What is claimed is:

1. A composite material comprising noble metal coated silver nanowires and a polymer matrix combined to form the composite material, the composite material having a resistivity of no more than about 1 Ohm-cm and less than about 10 wt % platinum coated silver nanowires.

2. The composite material of claim 1 having from about 0.01 wt % to about 10 wt % platinum coated silver nanowires.

3. The composite material of claim 1 wherein the platinum coated silver nanowires have an average diameter of 100 nm or less.

4. The composite material of claim 3 wherein the platinum coated silver nanowires occupy no more than about 2.5 vol % of the composite material.

5. The composite material of claim 1 wherein the polymer matrix comprises at least about 90 wt % of the composite material.

6. The composite material of claim 1 wherein the composite material further comprises other metal particulates in an amount no more than about the weight of the platinum coated silver nanowires.

7. The composite material of claim 1 wherein the concentration of platinum coated silver nanowires is no more than about 2.0 wt %.

8. The composite material of claim 1 wherein the concentration of platinum coated silver nanowires is no more than about 0.1 wt %.

9. A heater comprising two bus bars of opposite polarity and a composite material, wherein the composite material is in contact with the bus bars such that current flows between the bus bars when a voltage is applied, and wherein the composite material comprises noble metal coated silver nanowires and a polymer matrix combined to form the composite material and has a resistivity of no more than about $1\times10^{11}$ Ohm-cm.

10. The heater of claim 9 wherein the composite material has a resistivity of no more than about 100 Ohm-cm.

11. The heater of claim 9 wherein the composite material has a resistivity of no more than about 1 Ohm-cm.

12. The heater of claim 9 wherein the composite material comprises from about 0.01 wt % to about 40 wt % noble metal coated silver nanowires.

13. The heater of claim 9 wherein the composite material comprises from about 0.1 wt % to about 20 wt % noble metal coated silver nanowires.

14. The heater of claim 9 wherein the composite material comprises no more than about 10.0 wt % noble metal coated silver nanowires.

15. The heater of claim 9 wherein the noble metal coated silver nanowires occupy no more than about 2.5 vol % of the composite material.

16. The heater of claim 9 wherein the noble metal coated silver nanowires have an average diameter of 100 nm or less.

17. The heater of claim 9 wherein the noble metal coated silver nanowires comprise platinum coated silver nanowires.

18. The heater of claim 9 wherein the noble metal coated silver nanowires comprise platinum coated silver nanowires, and the composite material comprises from about 0.5 wt % to about 10 wt % of the platinum coated silver nanowires.

19. The heater of claim 9 wherein the polymer matrix comprises at least about 90 wt % of the composite material.

20. The heater of claim 9 wherein the composite material comprises a coating and the heater further comprises a polymer overcoat on the coating.

21. The heater of claim 9 wherein the heater has a transmittance value of at least about 90%.

22. The heater of claim 9 wherein the noble metal coated silver nanowires exhibit a power per area greater than about 0.5 $W/cm^2$ (2000 $W/m^2$).

* * * * *